C. B. KIRKPATRICK.
Stair-Builders' Adjustable Square.
No. 164,008.                      Patented June 1, 1875.
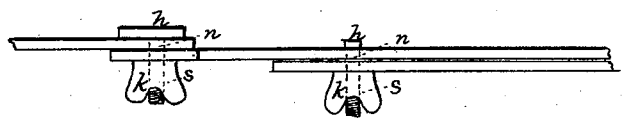
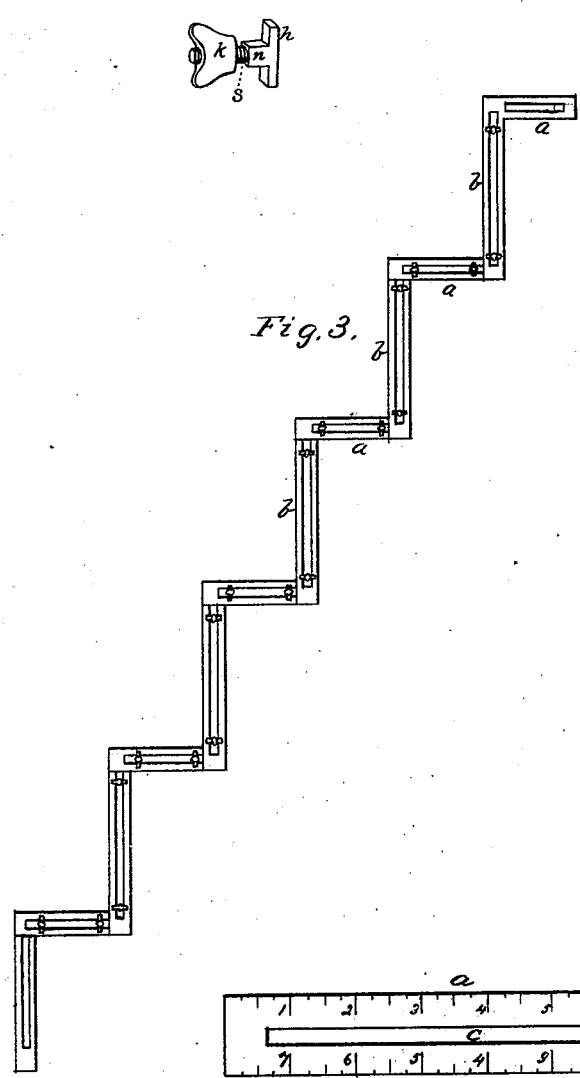
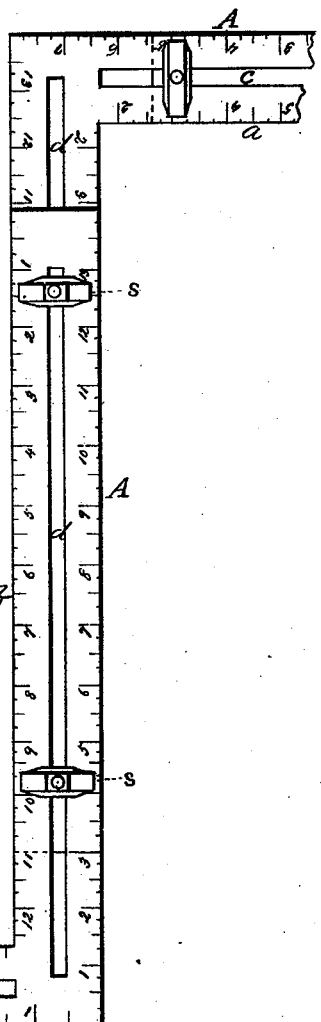
WITNESSES
INVENTOR
Columbus B. Kirkpatrick
ATTORNEYS

UNITED STATES PATENT OFFICE.

COLUMBUS B. KIRKPATRICK, OF PARKERSBURG, WEST VIRGINIA.

IMPROVEMENT IN STAIR-BUILDERS' ADJUSTABLE SQUARES.

Specification forming part of Letters Patent No. 164,008, dated June 1, 1875; application filed March 27, 1875.

*To all whom it may concern:*

Be it known that I, COLUMBUS B. KIRKPATRICK, of Parkersburg, in the county of Wood and State of West Virginia, have invented a new and valuable Improvement in a Stair-Builder's Adjustable Square; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a plan view of my square, and Fig. 2 is an edge view of the same. Fig. 3 is a plan view of the same.

This invention has relation to means for facilitating the laying or marking off of the angle-carriages of stairways, and especially of winding stairs; and it consists in the construction and novel arrangement of the combined series of squares, slotted in both branches longitudinally, and connected by two or more clamp-screws, in such a manner that the connected branches of the adjacent squares can be adjusted with relation to each other, to measure a rise or tread of any size, as hereinafter shown and described.

In the accompanying drawings, the letter A designates the squares, which are connected to form the instrument. Each square A consists of a short or rise branch, $a$, and a long or tread branch, $b$. These branches are, respectively, slotted longitudinally, as indicated at $c$ and $d$, and on each side of the slot a suitable scale is marked to facilitate measurements. In order that the instrument may be reversed, so that either side of it may be used uppermost, the scales are marked on both sides of each square.

The squares are connected in the following manner: The short branches of two adjacent squares are turned toward each other, so that the slot of one will overlie that of the other. Then through these slots are passed the stems of the clamp-screws $s$, two of which are sufficient to connect one pair of branches. These clamp-screws are provided with transverse heads $h$, and with squared necks $n$, which are located in the slots, and prevent the clamp-screws from turning when the nuts $k$ are screwed up home.

When it is desired to extend or shorten the measure which is formed by the connected branches, the clamp-screws are loosened, the branches adjusted, and then the screws are tightened again. The long branches of adjacent squares are connected in a precisely similar manner, and serve as the measurement for the tread, while the short-branch connection serves to measure the rise of the stair.

When it is desired to reverse the instrument the thumb-nuts are sufficiently loosened to let the squared necks of the clamp-screws drop out of the slots; then the heads of the clamp-screws are turned in the direction of the slots and drawn through the same, after which they are reinserted from the other side and retightened. Time is saved in this operation, as it is not necessary to remove the thumb-nut entirely from the screw-stem.

For ordinary use six of these squares thus connected will make an efficient instrument; but more may be employed, if thought desirable. As the instrument is sufficiently flexible, it will serve an admirable purpose for laying off the carriages of winding stairs.

What I claim as new, and desire to secure by Letters Patent, is—

The square herein described, having short branches $a$ and long branches $b$, slotted longitudinally, and connected in pairs of short branches and of long branches by clamp-screws $s$, to form an adjustable rise and tread measuring instrument for stair-builders, substantially as specified.

In testimony that I claim the above I have hereunto subscribed my name in the presence of two witnesses.

COLUMBUS BURROUGS KIRKPATRICK.

Witnesses:
J. C. NASH,
K. B. STEPHENSON.